(12) United States Patent
Fyock

(10) Patent No.: US 8,250,610 B2
(45) Date of Patent: Aug. 21, 2012

(54) METHOD, COMPUTER PROGRAM PRODUCT AND APPARATUS FOR RECEIVING RECORDING RECOMMENDATIONS

(75) Inventor: Christina L. Fyock, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 976 days.

(21) Appl. No.: 11/767,255

(22) Filed: Jun. 22, 2007

(65) Prior Publication Data
US 2008/0320183 A1    Dec. 25, 2008

(51) Int. Cl.
*H04N 5/445* (2006.01)
(52) U.S. Cl. ............... 725/61; 725/32; 725/34; 725/25; 725/58; 725/105; 725/109
(58) Field of Classification Search .................. 725/37
See application file for complete search history.

(56) References Cited

U.S. PATENT DOCUMENTS

| | | | |
|---|---|---|---|
| 6,477,708 B1 * | 11/2002 | Sawa | 725/116 |
| 6,813,775 B1 * | 11/2004 | Finseth et al. | 725/46 |
| 7,296,284 B1 * | 11/2007 | Price et al. | 725/39 |
| 2003/0005448 A1 * | 1/2003 | Axelsson et al. | 725/58 |
| 2003/0110490 A1 * | 6/2003 | Dew et al. | 725/37 |
| 2003/0204848 A1 * | 10/2003 | Cheng et al. | 725/58 |
| 2004/0101271 A1 * | 5/2004 | Boston et al. | 386/46 |
| 2006/0161950 A1 * | 7/2006 | Imai et al. | 725/46 |
| 2006/0277272 A1 * | 12/2006 | Cantalini | 709/217 |
| 2008/0270561 A1 * | 10/2008 | Tang et al. | 709/207 |

* cited by examiner

*Primary Examiner* — Nicholas Corbo

(57) ABSTRACT

Methods, computer program products, and apparatuses for receiving recording recommendations through a data network are provided. The recommendations originate from sources selected by the user. Each source may send a recommendation from his or her set top box or other computing device connected to the data network. The user may establish and send recommendation instructions used to filter and prioritize the recommendations based on the source of the recommendation. The user may send the recommendation instructions from his or her set top box or another computing device connected to the data network. Based at least partially by the recommendation instructions, the set top box of the user may receive a recommendation from a source and record at least one media program subject to the recommendation.

14 Claims, 6 Drawing Sheets

METHOD, COMPUTER PROGRAM PRODUCT AND APPARATUS FOR RECEIVING RECORDING RECOMMENDATIONS

BACKGROUND

With the gaining popularity of digital video recorders, more users are watching only the programs and movies they record and are skipping over commercials within those programs and movies. Therefore these users often miss the advertisements for new programs. Without commercials, the users may have to rely more on recommendations from friends, family members, affinity groups and other sources (e.g., religious, school or hobby groups, or websites and publications of interest) to determine what programs to record.

Some digital video recording services provide recommendations to users by monitoring past viewing and recording selections of the users. However such services often have problems accurately predicting what media programs the users would want to watch in the future. One particular problem may be multiple users using the digital video recorder. For example, each family member may use the digital video recorder and one family member may prefer classic theatre programs, another family member may prefer science fiction, and yet another member may enjoy children entertainment. Facing the divergent preferences of the family members, the service may over compensate by providing too many recommendations or fail to make any recommendations because the service cannot identify any programming to satisfy the collective interest of the family members (e.g., no Shakespearian sci-fi cartoons).

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Embodiments generally relate to methods, computer program products, apparatuses, and systems for receiving recommendations from selective sources and providing recordings based at least partially on the recommendations. The selective sources may be pre-selected by a user. Examples of sources may be one or more friends, family members, and affinity groups (e.g., religious, school, hobby, and social groups). Other examples of sources may include publications (e.g., newspapers, magazines, and periodicals) and other non-commercial and commercial entities that provide a service of recommending movies, TV programs, or other media content to its subscribers or readers. For example, a newspaper, such as the NY Times, may provide a section in which its critics review and recommend particular movies, TV programs, and other media programs to its readers.

Figure 1:
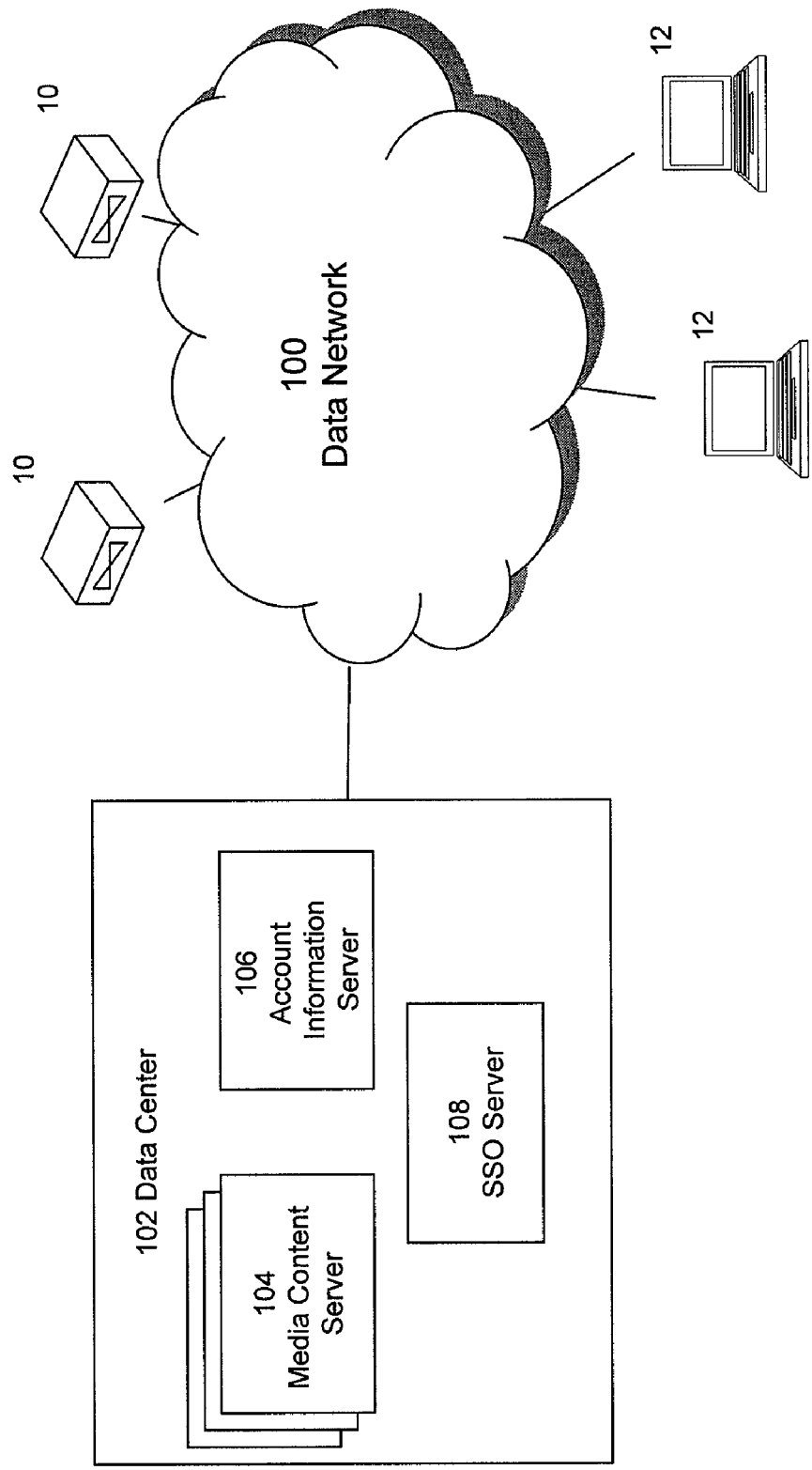
FIG. 1 is a block diagram of a data network consistent with an exemplary embodiment.

As illustrated in FIG. 1, the selection of the sources by the user and/or the receipt of the recommendations and recording settings may be facilitated at least partially through a data network 100 and one or more communication and/or peripheral devices that are within or directly connected to the data network 100. The data network may be wired or wireless (e.g., satellite) or a combination of both. The data network may include a Wide Area Network ("WAN"), a Local Area Network ("LAN"), an intranet and/or the Internet. As a more specific example, at least part of the data network may be part of a fiber optic network, such as fiber-to-the-home ("FTTH"), fiber-to-the-premises ("FTTP"), fiber-to-the-curb ("FTTC"), fiber-to-the-X ("FTTX") and other fiber optic networks of one or more media and telephone service providers configured to deliver services to a number of users or subscribers.

The communication devices and/or peripheral devices that are within or directly connected to the data network 100 may include computers 12, such as servers, desktops and laptops, and have various communication programming applications including email and an Internet browser. Another communication device may be a set top box 10. The set top box 10 may be configured to receive one or more signals representing a media program from an external source and convert the signals into the media program for display on a television that is in communication with the set top box.

Figure 2:
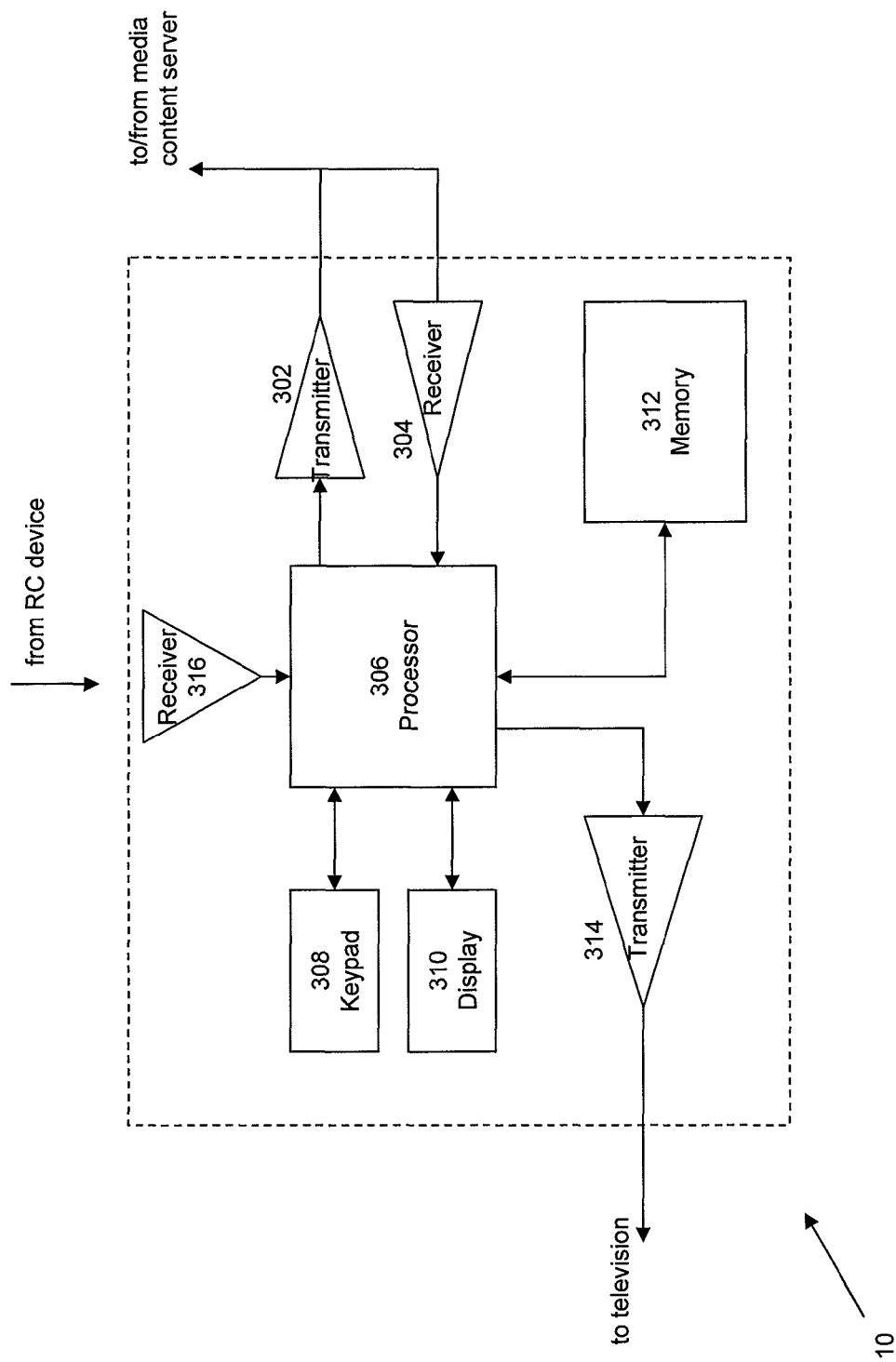
FIG. 2 is a block diagram of a set top box consistent with an exemplary embodiment.

As shown in FIG. 2, the set top box 10 may include a first transmitter 302, a first receiver 304, a processor 306, a user interface such as a keypad 308, a display 310, at least a first memory element 312, a second transmitter 314, and a second receiver 316. The first receiver 304 is configured to receive the media program from the external source through the data network 100. For examples, the set top box may include an adapter or port for receiving a fiber optic cable or a coaxial cable of the data network or a wireless receiver, such as an antenna. And the external source may be one or more media content servers or other computing devices of a media provider that is communicatively coupled to the set top box through the data network. The processor 306 may be configured to provide processing and command functions, which may include translation or conversion of the received signals into an output suitable for display on the television. The processor 306 may also be configured to send the media program through the second transmitter 314 of the set top box 10 to the television. Although not illustrated, the media set top box may have a third transmitter and the processor 306 may be configured to process the received signals into two outputs, i.e., a video output sent through the second transmitter for display on the television and a sound output sent through the third transmitter to a sound system either integrated with the television or a stand alone system. The display of the set top box may include information such a clock and/or the current channel for the television, and/or indicators on whether or not the set top box is powered on and/or whether it is recording. In instances in which the user interface includes a keypad, the keypad 308 may include one or more buttons to allow a user to enter commands and selections into the set top box 10. The second receiver 316 may be configured to receive radio signals from a remote control device (not illustrated) as another method of receiving commands and selections from a user. The processor 306 may also be configured to send a request through the first transmitter 302 to the media provider for particular media program based on commands and selections from the user. The request may include a live media program or for a video on demand ("VOD"). The processor 306 may also record the signals for the requested media program into the memory element 312 based on commands and selections from the user (i.e., the set top box may include a digital video recorder ("DVR")). For example, the user may request for a future program to be recorded. At the scheduled time for the media program, the processor 306 may request the corresponding signals for the media program, also referred to herein as media programming signals, and store the media programming signals into the memory element. The stored or recorded media program is viewable to the user upon request. In particular, the processor 306 may retrieve a recorded program from the memory element 312 and send it to the television to be viewed by the user upon request from the user. The memory element 312 may also maintain programming instructions, i.e. software, pertaining to the functions and operability of the set top box.

The set top box 10 may also be configured to receive signals from the media provider that represent an interactive programming guide ("IPG") for the user. In particular, upon request from the user, the processor 306 sends a request to the media provider for the signals that provide the IPG. In response to the request, the media provider sends the IPG to the set top box. The IPG may be customer specific, i.e., the media provider may send an IPG that corresponds to an account of the user, which may take into consideration the channels available to the user based on the location of the set top box and the subscription of the user, e.g., a basic channel package or a channel package with premium channels.

The processor 306 sends the IPG to the television for interaction with the user. The IPG may display a listing of channels, times, and programming and the user may browse through the listing through either the keypad 308 or remote control device. The user may be able to select programs to watch or to be recorded, call up recorded programs, and/or order videos on demand. The processor 306 either executes the selections or stores them within the memory element 312 for future execution.

It is understood that the set top box may be a stand alone device or be integrated within the television. Moreover, a television may be any monitor capable of displaying the media content from the set top box. For example, a television may be a LCD display or monitor.

Referring back to FIG. 1, the data network 100 may also include or be in communication with at least one data center 102. The data center 102 may provide a platform for managing information or communications between differing networks, such as between the data network and a wireless communication network and/or the Public Switched Telephone Network ("PSTN") or a private branch exchange ("PBX"). The data center 102 may also provide gateway functions, such as code and protocol conversions, to transfer information or communications between different networks. The data center 102 may be implemented using a combination of hardware, software, and/or firmware. For example, the data center 102 may be implemented using a plurality of general purpose computers or servers that are co-located or located in more than one location. The data center 102 may include or otherwise be in communication with one or more media content servers 104 (collectively, the media content servers may be referred to as a content server farm). The media content servers 104 collectively provide at least some of the storage and processing functions for the media provider for delivering the media programs and/or IPGs to the set top box 10. The data center 102 may also include an account information server 106 and a single sign on "SSO" server 108.

In general, an account includes information and/or instructions pertaining to a particular user. The SSO server may be configured to authenticate and approve access to information stored within the account information server 106 or other information stored in additional servers of the data center 102. In particular, the user may access his account on the account information server 106 by logging on through the SSO server 108 by using one of the communication devices 10, 12. For example, the user may be able to log on through a web page on a computer 12. Although the data center 102 is shown with direct connections to the data network 100 any number and type of network elements may be interposed between the data center 106 and the data network (e.g., LCR, GWR, BHR, and other routers, and/or optical line terminals).

The data center 102 may also be configured to receive and store recommendation instructions from a first user, the recommendation instructions relating to how recommendations for the first user from one or more sources are to be received and followed. For example, a first user may log-on through a web page on a computer or through his or her set top box to provide instructions on receiving and following recommendations provided by other users. The instructions may provide (1) one or more sources from which the user will accept recommendations; (2) a priority protocol or ranking on the relative importance of the recommendations; and (3) reaction, if any, to the recommendations.

As explained above, a source may be a friend, family member, and an affinity group, a publication, or any other entity that may provide recommendations for media programs. The source may be identified by name (legal name, screen name, nick name), by device address (e.g., IP address, URL, MAC address) or another identifier (e.g., email address, account number) such that when the data center receives a recommendation from a particular source, also referred to as a "recommender," for the first user, the data center can determine whether or not the recommendation should be accepted according to the recommendation instructions.

The priority protocol may include a series of rules established at least partially by the first user to determine a relative importance of a particular recommendation. For example, the user may weigh the recommendations based on the source, i.e., the first user may consider a recommendation from a first source more important than a recommendation from a second source. The sources may be ranked in a numerical order of importance or each source may be given a relative importance on a scale, e.g., low, medium, and high. A user may also weigh the recommendations based on the type (e.g., sitcom, drama, special, movie, genre, etc . . . ), time of showing, channel, or other attributes of the media program that is the subject of the recommendation.

The reaction may vary depending on the recommendation and the priority protocol. For example, one or more of the recommendations may be stored and the first user may be able to review the recommendations either on the webpage on his or her computer or a television associated with the set top box. As another example, the data center may send a command to the set top box of the first user to record a media program according to a recommendation. Moreover, the recording of the media program may be conditioned on other rules established by the priority protocol. As an example, the recording of the media program may be conditioned on not conflicting with another recording having a higher priority.

As indicated above, the first user may set up or change the recommendation instructions either through logging on a computer, his or her set top box, or another computing device connected to or within the data network. The webpage or the set top box may include a graphic user interface ("GUI") that provides options and explanations to the first user regarding how to set up or change recommendation instructions. For example, the GUI may provide icons, windows, or drop down boxes to help the first user set up or edit the recommendation instructions. The recommendation instructions may be stored as part of the user's account and thus may be available through the account information server.

Figure 3:
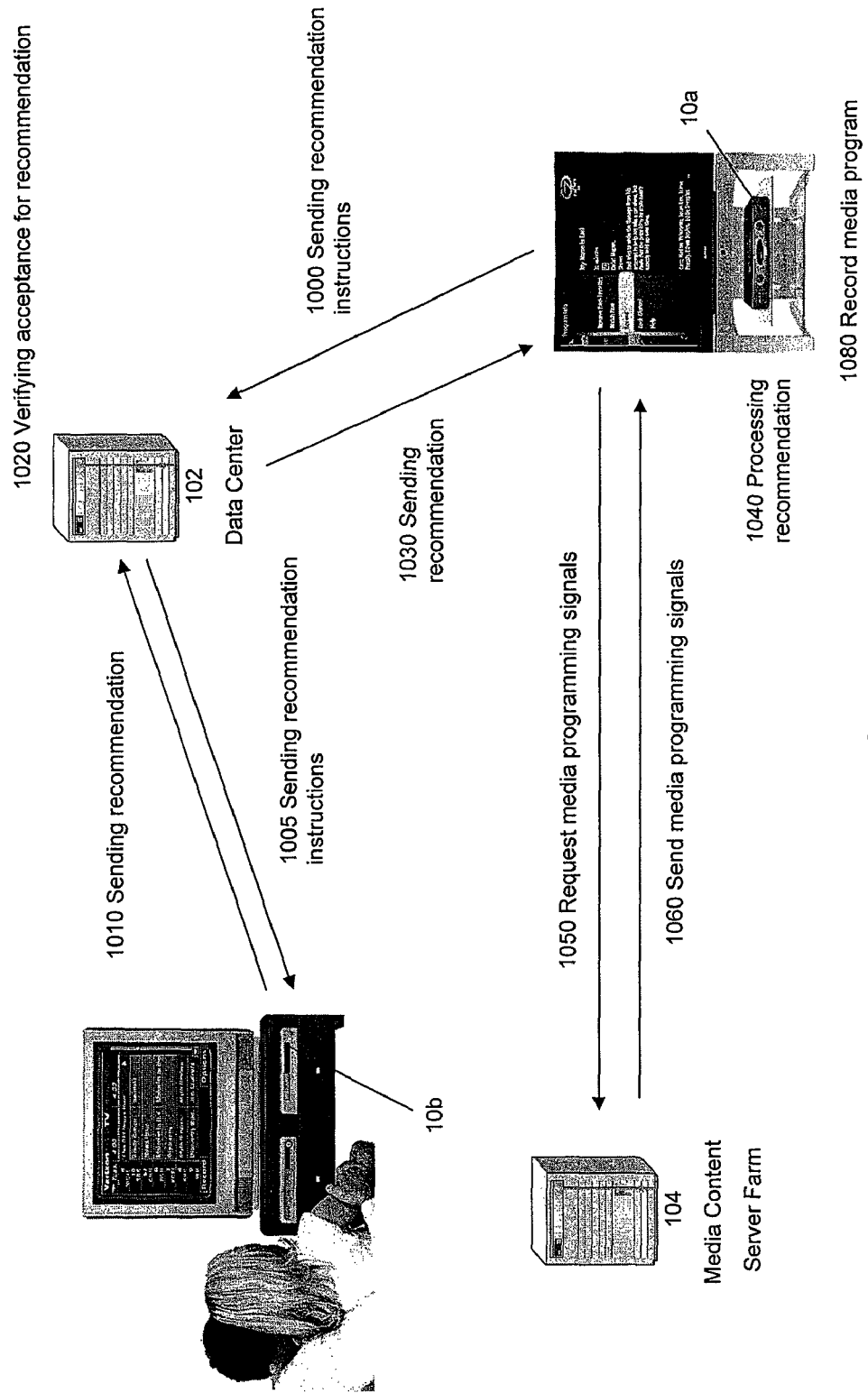
FIG. 3 is a flow chart illustration of a method according to an exemplary embodiment.

The method and manner in which the recommendations are provided may vary. For example and as shown in FIG. 3, a source may be a friend, referred to as a second user, who also has a set top box 10b. The set top box 10b, or more specifically the processor, of the second user may be configured to receive media programming signals including an IPG. The processor may send the signals that represent the IPG to the television associated with the set top box 10b of the second user. The IPG provides a GUI for the second user to interface with to browse the media programs by channel and time and also allow for the second user to select a particular media program for recording as described above. The IPG may also allow for the second user to select a media program to be recorded on the set top box of the first user. More specifically, using the keypads or remote control device to interact with the IPG, the second user may select a command, i.e., a recommendation, to record a media program on set top box 10a of the first user. The processor of the set top box is configured to process the recommendation and send the recommendation to the data network. As a more specific example, the set top box of the second user may transmit the recommendation to the data center. Based on the recommendation instructions from the first user, the data center may send the recommendation to the set top box of the first user, wherein the processor of the set top box is configured to process the recommendation and record the media program in accordance with the recommendation.

FIG. 3 illustrates a system overview consistent with exemplary embodiments. The first user 10a sends recommendation instructions 1000 to the data center. The data center may send the recommendation instructions 1005 to the set top box of the second user, if the recommendation instructions pertain to the second user. This may alert the second user that the first user will take or solicits the recommendations of the second user. The second user sends a recommendation 1010 from his or her set top box intended for the first user. In one or more embodiments, the set top box of the second user may store at least part of the recommendation instructions to indicate to the second user whether the first user accepts recommendations from the second user. The data center verifies whether or not the first user accepts recommendation 1020 from the second user according to the recommendation instructions. If access is allowed, the recommendation is sent 1030 to the set top box of the first user. Before or at the scheduled time of the media program (or programs) that is the subject of the recommendation, the set top box of the first user processes the recommendation 1040 and requests the media programming signals for the recommended media program from the media content servers 1050. The media content servers send the media programming signals 1060 for the recommended media program at the scheduled time to the set top box of the first user. And the set top box records the program according to the recommendation 1080.

Figure 4:
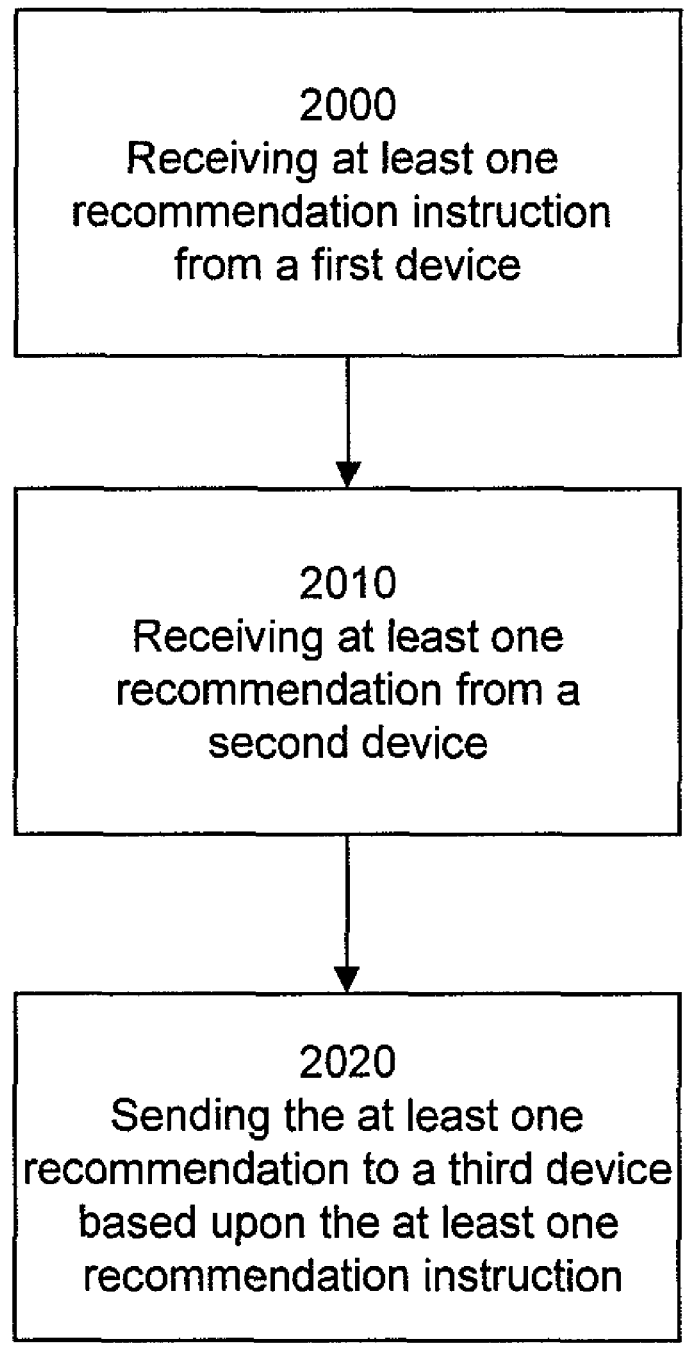
FIG. 4 is a flow chart illustration of a method according to an exemplary embodiment.

FIG. 4 illustrates a method according to an exemplary embodiment. The method may include receiving at least one recommendation instruction 2000, receiving at least one recommendation from a second device 2010, and sending the at least one recommendation to a third device based upon the at least one recommendation instruction 2020. The method may further include sending the at least one recommendation instruction to the second device. The first and third devices may be the same device. For example, the first and third devices may be a set top box of the first user. Or as another example, the first device may be a computer, such as a home desktop of the first user, and the third device may be a set top box of the first user. The second device may be a set top box of the second user or another computing device in which the second user has access. The sending of the at least one recommendation to a third device based on the recommendation instructions may include identifying the source of the at least one recommendation, verifying the acceptance of the source as a recommender by the first user, applying one or more priority protocols to the at least one recommendations, and sending one or more instructions with at least one recommendation to the third device. For example, the instructions may be for the third device to record a particular media program based on the at least one recommendation or may be to only list the recommendation in the IPG to allow the first user to see what media program the second user is recommending but not to record the media program without further input from the first user. Other examples may include to record the media program unless it conflicts with another recording or would cause the loss of another recording due to storage capacity within the set top box.

The operations described for the illustrated method of FIG. 4 may be performed through hardware, software, or combination thereof. Therefore embodiments may take the form of hardware systems and/or apparatuses, software, or combinations thereof. As an example, embodiments may include a computer program product (i.e. software) stored on a computer-readable storage medium comprising of one or more executable portions for performing the operations described herein. As another example, one or more of the devices and/or systems of the data center may perform one or more of the operations. In one embodiment, a processor of a computing device of the data center may be configured to perform one or more of the operations illustrated in FIG. 4 and described above.

Figure 5:
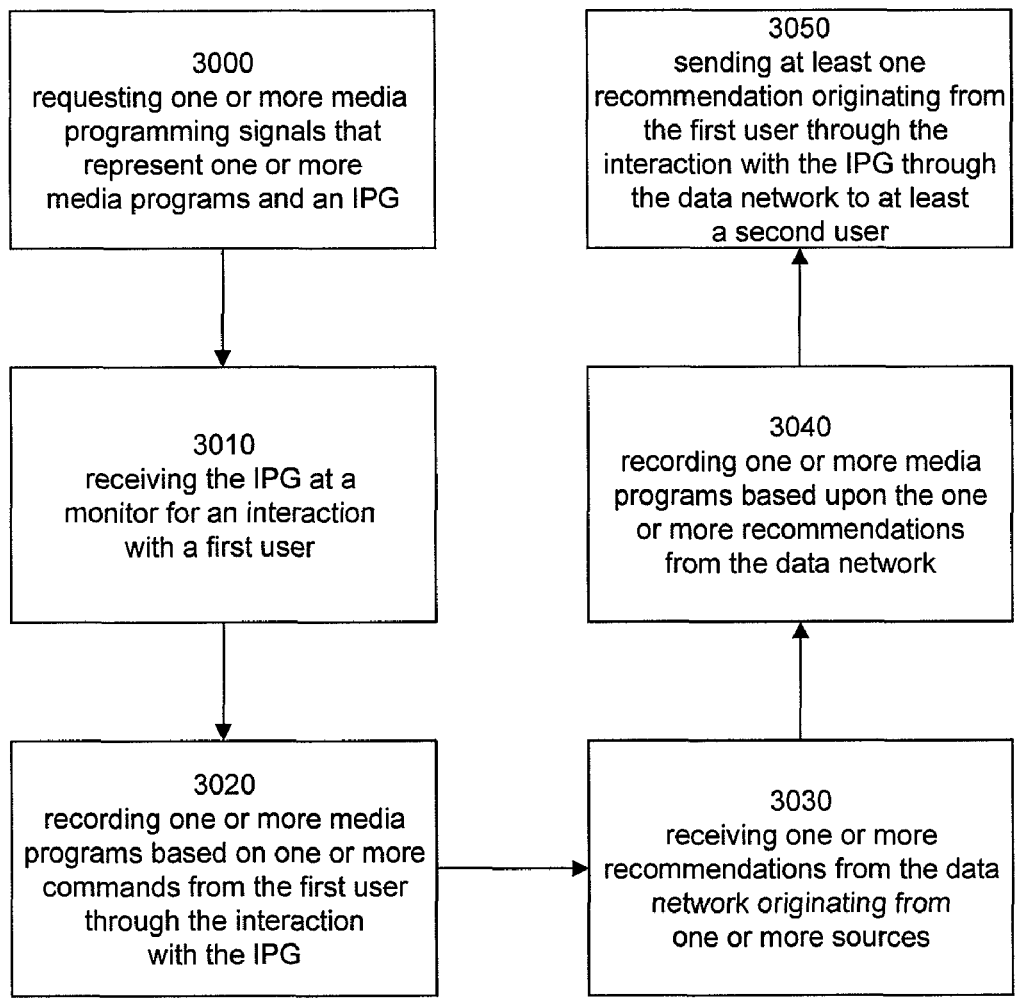
FIG. 5 is a flow chart illustration of a method according to an exemplary embodiment.

FIG. 5 illustrates another method according to an exemplary embodiment. The method may include requesting one or more media programming signals that represent one or more media programs and an IPG 3000, receiving and displaying the IPG at a monitor for an interaction with a first user 3010, recording one or more media programs based on one or more commands from the first user through the interaction with the IPG 3020, receiving one or more recommendations from the data network originating from one or more sources 3030; recording one or more media programs based upon the one or more recommendations from the data network 3040; and sending at least one recommendation originating from the first user through the interaction with the IPG through the data network to at least a second user 3050. The method may further include sending one or more recommendation instructions to the data network for filtering the one or more recommendations originating from the one or more sources based upon the source of each of the one or more recommendations. As another example, the method may also include receiving one or more IP data with the one or more recommendations originating from the one or more sources and sending the one or more IP data to the monitor for viewing. The IP data may provide information about the recommendations.

The operations illustrated in FIG. 5 and discussed above may be performed through hardware, software, or combination thereof. Therefore embodiments may take the form of hardware systems and/or apparatuses, software, or combinations thereof. As an example, embodiments may include a computer program product (i.e. software) stored on a computer-readable storage medium comprising one or more executable portions for performing the operations described herein. As another example, one or more of the devices and/or systems of the data network may perform one or more of the operations. In one embodiment, a processor of a set top box or other computing device may be configured to perform one or more of the operations illustrated in either one or both of FIG. 5. As a more specific example, according to an embodiment, an apparatus may include a memory for storing one or more media programs and a processor configured to perform the operations of FIG. 5. According to this example, the processor is configured to process recommendations sent to the apparatus from the data network and also configured to send recommendations to the data network. The recommendations sent from the apparatus may be independent from any recommendations sent to the apparatus.

Figure 6:
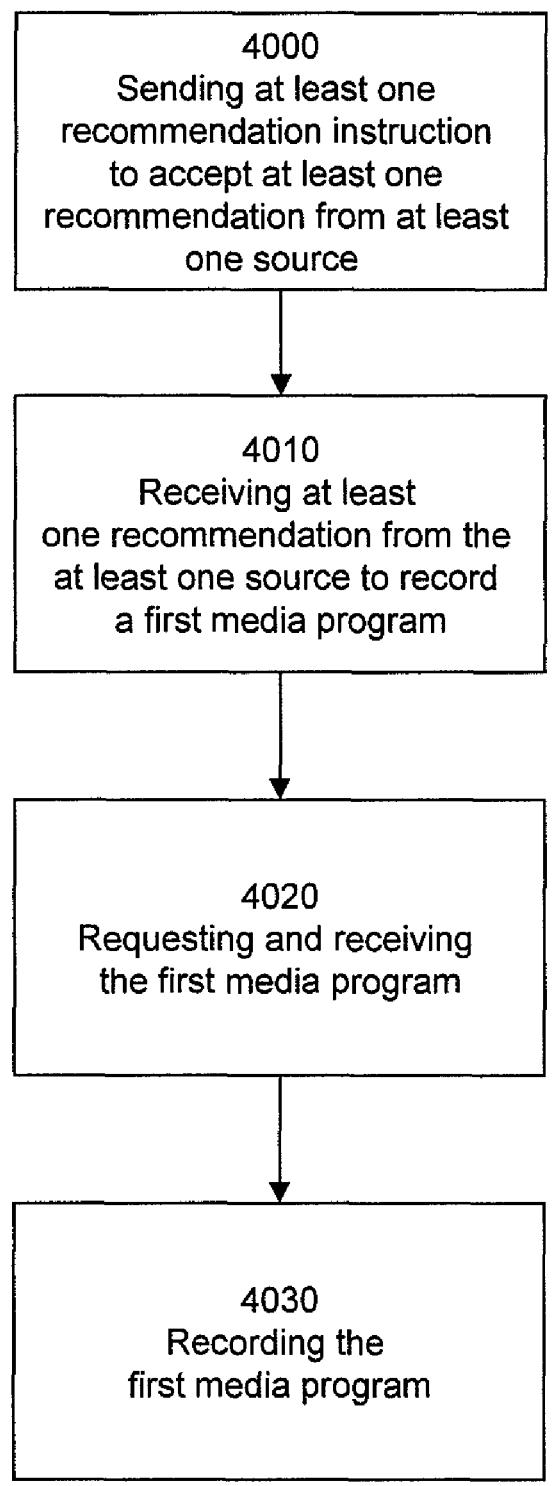
FIG. 6 is a flow chart illustration of a method according to an exemplary embodiment.

FIG. 6 illustrates yet another method according to an exemplary embodiment. The method may include sending at least one recommendation instruction to accept at least one recommendation from at least one source 4000, receiving at least one recommendation from the at least one source to record a first media program 4010, requesting and receiving the first media program 4020, and recording the first media program 4030. The at least one source may be a friend, a family member, an affinity group, a magazine, a publication, or other entity that may provide recommendations for media programs. The at least one recommendation instruction may be sent to a device associated with the source such as a set top box, a server, or other computing device. As a more specific example and explained above, the at least one recommendation instruction may be sent to the set top box of a friend or family member, referred above as the second user. As another example, the at least one recommendation instruction may be sent to a server in communication with the data network that is associated with the source, such as a web page, newspaper, magazine, publication, or other entity that offers recommendations to its readers or subscribers. The server may collect a plurality of recommendation instructions from a plurality of readers or subscribers allowing the server to form a mailing list (i.e., a list of subscribers who want the source to send them recommendations). One or more of the operations above may include sending and receiving the instructions and recommendations to at least one intermediate device, such as the data center as discussed above.

The operations described for the illustrated method of FIG. 6 may be performed through hardware, software, or combination thereof. Therefore embodiments may take the form of hardware systems and/or apparatuses, software, or combinations thereof. As an example, embodiments may include a computer program product (i.e. software) stored on a computer-readable storage medium comprising of one or more executable portions for performing the operations described herein. As another example, one or more of the devices and/or systems of the data network may perform one or more of the operations. In one embodiment, a processor of a set top box or other computing device may be configured to perform one or more of the operations illustrated in either one or both of FIG. 6 and described above.

The processor of a set top box or other computing device disclosed herein may be embodied in many ways. For example, a processor may be embodied as a coprocessor, a controller or various other processing means or devices including integrated circuits such as, for example, an application specific integrated circuit ("ASIC"). The memory elements described herein may be various memory structures including volatile and non-volatile memory structures. Any of the memory elements may be configured to store information, data, applications, instructions or the like for enabling the devices disclosed herein to carry out various functions in accordance with exemplary embodiments. For example, a memory element could be configured to buffer input data for processing by a respective processor.

A recommendation may be combined with IP data (messages and/or images) written by the source of the recommendation to the user or users to whom the recommendation is being sent. For example, a source may send a request from its computing device to the data center to either overlay IP data into the media programming signals sent to a set top box of the user or replace the media programming signals with IP data. The IP data can be served through the media content servers to the set top box. As an example, the IP data may provide a message to the user discussing or explaining its recommendation or to provide other information. The IP data, or the message it represents, may be overlaid onto the media program or may appear only in the IPG along with the media program listings.

As discussed above, a set top box, like the one illustrated in FIG. 2, may be configured to receive media programming signals that correspond to a media program or an IPG. The set top box may also include a recording function allowing for the recording of a media program and the playing of the recorded media program when requested by a user. Embodiments descried herein include the recording of particular media programs based on recommendations from external sources rather than by the user entering commands using the IPG and either the remote control device or keypads on the set top box. The processor of the set top box is configured to process the commands and recommendations, request the media programming signals for the media programs at the schedule times, and record the media programming signals. The recorded media programs are stored in the memory 312 of the set top box. The processor 306 may be further configured to receive the media programming signals for the IPG and overlay information about the media programs stored in memory as part of the IPG such that a user can view the information through the IPG display on the television. The information may be organized and/or presented in a variety of formats. For example, the recorded media programs may be organized by the source that recommended the media programs, such that the user can see what programs were recorded based on a recommendation from a first source (e.g., a family member) and a second source (e.g., Parenting Magazine).

Although the embodiment above generally described an intermediate device, such as a computing device at the data center, configured to receive the recommendation instructions from a first user and to filter recommendations based upon the recommendation instructions. In other embodiments, the set top box or other user-side or client device may be configured to filter out recommendations based upon the preferences or recommendation instructions of the user.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An apparatus comprising:
    a memory for storing one or more media programs; and
    a processor configured to:
        receive one or more recommendation instructions from a data center by way of a data network, the recommendation instructions comprising a specification of a user of the apparatus as a source from which recommendations are accepted by another user associated with another apparatus;

receive an interactive programming guide from the data center for display by an associated monitor, the interactive program guide configured to allow the user to select one or more media programs for presentation or recording by the apparatus and one or more media programs for recording by the another apparatus associated with the another user; and send, based on input provided by the user, a command to the data center for the other apparatus to record a media program included in the interactive program guide.

2. The apparatus according to claim 1, wherein the processor is further configured to send the command based on an interaction of the user with the interactive programming guide.

3. The apparatus according to claim 1, wherein the processor is further configured to send IP data with the command, wherein the IP data provides information regarding the media program.

4. A method comprising:

receiving, by a data center, at least one recommendation instruction from a first device associated with a first user, the at least one recommendation instruction specifying a second device associated with a second user as a source from which recommendations are accepted by the first user and one or more priority protocols for prioritizing recommendations received from the second device;

sending, by the data center, the at least one recommendation instruction to the second device to alert the second user that the first user will accept the recommendations from the second user;

providing, by the data center, an interactive program guide to the second user by way of the second device, the interactive program guide configured to allow the second user to select one or more media programs for presentation or recording by the second device and one or more media programs for recording by the first device associated with the first user;

receiving, by the data center from the second device based on input provided by the second user, a command for the first device to record a media program included in the interactive program guide; and directing, by the data center, the first device to record the media program in accordance with the command and the one or more priority protocols.

5. The method according to claim 4, wherein the first device comprises at least one of a computer and a set top box device.

6. The method according to claim 4, further comprising verifying, by the data center, an acceptance of the second user as a recommender in accordance with the at least one recommendation instruction.

7. The method according to claim 4, further comprising sending, by the data center, IP data representative of information input by the second user and associated with the media program to the first device.

8. A computer program product comprising a non-transitory computer-readable storage medium having computer-readable program code portions stored therein, the computer-readable program code portions comprising:

a first executable portion for receiving at least one recommendation instruction from a first device associated with a first user, the at least one recommendation instruction specifying a second device associated with a second user as a source from which recommendations are accepted by the first user and one or more priority protocols for prioritizing recommendations received from the second device;

a second executable portion for sending the at least one recommendation instruction to the second device to alert the second user that the first user will accept the recommendations from the second user;

a third executable portion for providing an interactive program guide to the second user by way of the second device, the interactive program guide configured to allow the second user to select one or more media programs for presentation or recording by the second device and one or more media programs for recording by the first device associated with the first user;

a fourth executable portion for receiving, based on input provided by the second user, a command for the first device to record a media program included in the interactive program guide; and a fifth executable portion for directing the first device to record the media program in accordance with the command and based on the one or more priority protocols.

9. The computer program product of claim 8, wherein the first device comprises at least one of a computer and a set top box device.

10. The computer program product of claim 8, wherein the second executable portion is further configured to verify an acceptance of the second user as a recommender in accordance with the at least one recommendation instruction.

11. The computer program product of claim 8 further comprising a sixth executable portion for sending IP data representative of information input by the second user and associated with the media program to the first device.

12. An apparatus comprising a processor configured to:

receive at least one recommendation instruction from a first device associated with a first user, the recommendation instruction specifying a second device associated with a second user as a source from which recommendations are accepted by the first user and one or more priority protocols for prioritizing recommendations received from the second device;

send the at least one recommendation instruction to the second device to alert the second user that the first user will accept the recommendations from the second user;

provide an interactive program guide to the second user by way of the second device, the interactive program guide configured to allow the second user to select one or more media programs for presentation or recording by the second device and one or more media programs for recording by the first device associated with the first user;

receive, from the second device based on input provided by the second user, a command for the first device to record a media program included in the interactive program guide; and direct the first device to record the media program in accordance with the command and the one or more priority protocols.

13. The apparatus according to claim 12, wherein the processor is further configured to verify an acceptance of the second user as a recommender in accordance with the at least one recommendation instruction.

14. The apparatus according to claim 12, wherein the processor is further configured to send IP data representative of information input by the second user and associated with the media program to the first device.

* * * * *